United States Patent Office 3,428,469
Patented Feb. 18, 1969

3,428,469
PLASTIC AND RESIN STABILIZED WITH
BORATES OF ALKANOLAMINES
Henryk A. Cyba, Evanston, Ill., assignor to Universal Oil
Products Company, Des Plaines, Ill., a corporation of
Delaware
No Drawing. Continuation-in-part of application Ser. No.
367,854, May 15, 1964. This application Mar. 6, 1968,
Ser. No. 710,791
U.S. Cl. 106—186                              5 Claims
Int. Cl. C08b 27/68; C08f 45/60; C08g 51/60

ABSTRACT OF THE DISCLOSURE

Plastic and resin selected from polyester, polycarbonate, polyurethane, epoxy resin, ABS and cellulose plastic stabilized against deterioration by weathering by an additive comprising a borate of N,N-di-sec-alkyl-alkanolamine or a borate of N,N-dicycloalkyl-alkanolamine.

CROSS REFERENCE TO RELATED APPLICATIONS

This is a continuation-in-part of corresponding application Ser. No. 367,854, filed May 15, 1964, now U.S. Patent No. 3,382,208.

DESCRIPTION OF THE INVENTION

The parent application discloses the stabilization against weathering of many solid organic substrates by incorporating therein certain borates. The claims in the parent application are directed to solid polymers selected from polyolefins, vinyl resins and polystyrene. The present application is directed to the stabilization of other plastics and resins which undergo deterioration due to weathering.

The present invention is particularly applicable for use in thermoplastic polymers which normally undergo deterioration upon exposure to sunlight. This deterioration is characterized in its early stages by the breaking of the polymer chain and the formation of carbonyl groups. As the deterioration continues, the plastic cracks and loses tensile strength to the point of mechanical failure. For example, electrical insulation prepared from plastic will undergo embrittlement, increase of power factor and loss of electrical resistance when used in exposed locations. In addition to the mechanical failure, many plastics upon exposure to ultraviolet light undergo discoloration.

In one embodiment, the present invention relates to a method of improving the weathering properties of a plastic or resin selected from polyester, polycarbonate, polyurethane, epoxy resin, ABS and cellulose plastic which comprises incorporating therein a borate of an alkanolamine selected from the group consisting of N,N-di-sec-alkyl-alkanolamine and N,N-dicycloalkyl-alkanolamine.

In a specific embodiment, the present invention relates to a method of improving the weathering properties of cellulose acetate which comprises incorporating therein a borate of N,N-di-sec-octyl-ethanolamine.

In another specific embodiment, the present invention relates to a method of improving the weathering properties of a solid polyester which comprises incorporating therein a borate of N,N-dicyclohexyl-ethanolamine.

In another embodiment the present invention relates to plastic or resin, normally subject to deterioration by weathering, containing as a stabilizer against such weathering of a borate as herein set forth.

As hereinbefore set forth, the novel weathering additive of the present invention is a borate of a particularly substituted alkanolamine. In one embodiment, the particularly substituted alkanolamine is an N,N-di-sec-alkyl-alkanolamine. In a particularly preferred embodiment, each sec-alkyl group contains from 3 to about 20 carbon atoms although, when desired, each alkyl group may contain up to about 40 carbon atoms. Illustrative preferred alkanolamines in this embodiment include N,N-di-isopropyl-ethanolamine,
N,N-di-sec-butyl-ethanolamine,
N,N-di-sec-pentyl-ethanolamine,
N,N-di-sec-hexyl-ethanolamine,
N,N-di-sec-heptyl-ethanolamine,
N,N-di-sec-octyl-ethanolamine,
N,N,di-sec-nonyl-ethanolamine,
N,N-di-sec-decyl-ethanolamine,
N,N-di-sec-undecyl-ethanolamine,
N,N-di-sec-dodecyl-ethanolamine,
N,N-di-sec-tridecyl-ethanolamine,
N,N-di-sec-tetradecyl-ethanolamine,
N,N-di-sec-pentadecyl-ethanolamine,
N,N-di-sec-hexadecyl-ethanolamine,
N,N-di-sec-heptadecyl-ethanolamine,
N,N-di-sec-octadecyl-ethanolamine,
N,N-di-sec-nonadecyl-ethanolamine,
N,N-di-sec-eicosyl-ethanolamine, etc., and corresponding compounds in which the ethanolamine moiety is replaced by propanolamine or butanolamine and, when desired, by pentanolamine, hexanolamine, heptanolamine, octanolamine, etc.

In general, it is preferred that the alkyl groups are the same. However, when desired, the alkyl groups may be different but both of them should be of secondary configuration. Illustrative compounds in this modification include N-isopropyl-N-sec-butyl-ethanolamine,
N-isopropyl-N-sec-pentyl-ethanolamine,
N-isopropyl-N-sec-hexyl-ethanolamine,
N-isopropyl-N-sec-heptyl-ethanolamine,
N-isopropyl-N-sec-octyl-ethanolamine,
N-sec-butyl-N-sec-pentyl-ethanolamine,
N-sec-butyl-N-sec-hexyl-ethanolamine,
N-sec-butyl-N-sec-heptyl-ethanolamine,
N-sec-pentyl-N-sec-hexyl-ethanolamine,
N-sec-pentyl-N-sec-heptyl-ethanolamine,
N-sec-hexyl-N-sec-heptyl-ethanolamine,
N-sec-hexyl-N-sec-octyl-ethanolamine, etc.

Here again, it is understood that the ethanolamine moiety may be replaced by an alkanolamine group containing up to 8 carbon atoms and preferably up to 4 carbon atoms. Although it is preferred that the substituents are alkyl groups, it is understood that the substituents may be alkenyl groups, but not necessarily with equivalent results.

In another embodiment, the particularly substituted alkanolamine is N,N-dicycloalkyl-alkanolamine. A preferred alkanolamine in this embodiment is N,N-dicyclohexyl-ethanolamine. Other compounds include N,N-dicyclobutyl-ethanolamine,
N,N-dicyclopentyl-ethanolamine,
N,N-dicycloheptyl-ethanolamine,
N,N-dicyclooctyl-ethanolamine,
N,N-dicyclononyl-ethanolamine,
N,N-dicyclodecyl-ethanolamine,
N,N-dicycloundecyl-ethanolamine,
N,N-dicyclododecyl-ethanolamine, etc., and similarly substituted compounds in which the ethanolamine moiety is replaced by an alkanolamine group containing from 3 to about 8 carbon atoms.

The N,N-di-sec-alkyl-alkanolamine and N,N-dicycloalkyl-alkanolamine for use in the present invention may be obtained from any suitable source. Some of these particularly substituted alkanolamines are available in the open market or they may be prepared in any suitable manner. In one method, the alkanolamine is subjected to reductive alkylation with an alkyl ketone or a cycloalkyl ketone. For example, N,N-dioctyl-ethanolamine is prepared by the reductive alkylation of ethanolamine with methyl heptyl ketone, ethyl pentyl ketone or propyl butyl ketone. Similarly, N,N-dicyclohexyl-ethanolamine is prepared by the reductive alkylation of ethanolamine with cyclohexanone. It is understood that the ketone will be selected with regard to the particular N,N-disubstituted-ethanolamine desired. The reductive alkylation is effected in the presence of hydrogen and a suitable reductive alkylation catalyst. Any suitable reductive alkylation catalyst is employed including those containing nickel, platinum, palladium, etc., preferably composited with a suitable support. A particularly preferred catalyst comprises a composite of from about 0.1 to about 2% by weight of platinum with alumina, which may or may not contain from about 0.01% to about 1% by weight of fluorine and/or chlorine. Another suitable catalyst comprises an intimate mixture of copper oxide, chromium oxide and barium oxide. When using the platinum catalyst, the temperature generally will be within the range of from about 200° to about 500° F. and a hydrogen pressure of from about 100 to about 3000 p.s.i. or more.

While the N,N-di-sec-alkyl-alkanolamine and N,N-dicycloalkyl-alkanolamine may be prepared by the reductive alkylation of the corresponding alkanolamine as hereinbefore set forth, in another and preferred method, the corresponding N,N-di-sec-alkylamine or N,N-dicycloalkylamine is subjected to oxyalkylenation by reaction with one mol of ethylene oxide, propylene oxide, butylene oxide or other desired alkylene oxide. This reaction is readily effected by charging the N,N-di-substituted-amine into a reaction zone and passing the alkylene oxide into contact with the amine. Preferably at least equal mole proportions of alkylene oxide and amine are employed, although an excess of one may be used to insure complete reaction. The reaction readily occurs at a low temperature which may range from room temperature to 150° C. in the absence of a catalyst.

It is an essential requirement of the present application that the alkanolamine is an N,N-di-substituted-alkanolamine and that these substituents are secondary alkyl or equivalent. It will be noted that the cyclohexyl substituent corresponds to a sec-alkyl substituent in that the carbon atom attached to the nitrogen is itself attached to two other carbon atoms. In another embodiment, the particularly substituted alkanolamine may contain one sec-alkyl group and one cycloalkyl group as, for example, in compounds as N-isopropyl-N-cyclohexyl-ethanolamine, N-sec-butyl-N-cyclohexyl-ethanolamine, N-sec-pentyl-N-cyclohexyl-ethanolamine, N-sec-heptyl-N-cyclohexyl-ethanolamine, N-sec-octyl-N-cyclohexyl-ethanolamine, etc., and corresponding compounds in which the ethanolamine moiety is replaced by an alkanolamine moiety of from 3 to about 8 carbon atoms.

The borate of the present invention is prepared in any suitable manner. Any suitable borylating agent may be used. Particularly preferred borylating agents are boric, boronic or borinic acids. Other borylating agents include trialkyl borates in which the alkyl groups preferably contain from 1 to 4 carbon atoms each. In the use of the latter type borylating agent, the reaction is effected by transesterification and, accordingly, there is no advantage to using trialkyl borates containing more than 4 carbon atoms in each alkyl group, although the higher boiling trialkyl borates may be used when satisfactory and advantages appear therefor. Still other borylating agents include alkyl boric acid, dialkyl boric acid, boric oxide, boric acid complex, cycloalkyl boric acid, dicycloalkyl boric acid, aryl boric acid, diaryl boric acid or substitution products of these with alkoxy, alkyl and/or halo groups.

The reaction of the borylating agent and alkanolamine is effected in any suitable manner. The ortho-borates are formed by heating and stirring the reactants at a temperature up to about 100° C. and thus within the range of from about 60 to about 100° C. when using boric acid. The meta-borates or boroxines are formed at temperatures above 100° C. and thus may be within the range of from about 100° to about 200° C. or more. The higher temperature of from about 100° to about 200° C. is used when employing trialkyl borates in order to effect the transesterification reaction. In one method the reactants are refluxed in the presence of a solvent. Any suitable solvent may be used and advantageously comprises an aromatic hydrocarbon solvent including benzene, toluene, xylene, ethylbenzene, cumene, etc., or mixtures thereof. Also, n-hexane, n-heptane, n-octane, n-decane, n-dodecane and chlorinated hydrocarbons may be used. In fact, any water azeotropic solvent which is non-reactive with boric acid or alkanolamine may be used. The use of a solvent is particularly preferred when boric acid or boric oxide is used as the borylating agent. When using a trialkyl borate as the borylating agent, the solvent may be omitted. While no catalyst normally is required, a catalyst may be used when employing the trialkyl borate. Any suitable catalyst may be employed including sodium hydrogen sulfate, potassium hydrogen sulfate, tin oxide, polyalkyl tin derivatives, alkoxy tin derivatives, polyalkyl titanium derivatives, alkoxy titanium derivatives, trialkyl or trialkoxy aluminum, etc. The borylating agent and alkanolamine generally are used in a mole proportion within the range of from about 0.3 to 1 and more particularly from about 0.5 to 1 mole proportion of borylating agent per one mole proportion of alkanolamine.

In another embodiment, an alcohol, including aliphatic or aromatic alcohol, or mercaptan, including aliphatic or aromatic mercaptan, is included in the reaction charge to satisfy one or two of the valences of the boron. When used, the alcohol or mercaptan generally is employed in an amount of from about 0.5 to about 2 mole proportions thereof per one mole proportion of the alkanolamine. Preferred aliphatic alcohols include methanol, isopropanol, ethanol, butanol, pentanol, hexanol, heptanol, octanol, nonanol, decanol, undecanol, dodecanol, tridecanol, tetradecanol, pentadecanol, hexadecanol, heptadecanol, octadecanol, nonadecanol, eicosanol, etc. Preferred aromatic alcohols include phenol, cresol, xylenol, etc., or those having alkoxy or halo substituents. Preferred mercaptans include butyl mercaptan, pentyl mercaptan, hexyl mercaptan, heptyl mercaptan, octyl mercaptan, nonyl mercaptan, decyl mercaptan, undecyl mercaptan, dodecyl mercaptan, etc., and thiophenol, thiocresol, thioxylenol, etc.

As hereinbefore set forth, the reaction is readily effected by heating and refluxing the borylating agent and alkanolamine, with or without solvent and/or catalyst as required. Refluxing is continued until the required amount of water when using boric acid or alcohol when using trialkyl borate is collected. Following completion of the reaction, the solvent and alcohol, if any, are removed by vacuum distillation. The borated alkanolamine is recovered as a liquid and used as such or, when desired, the product may be retained in the solvent and used as such or the product may be prepared as a solution in a different solvent and used in this manner.

The exact structure of the borated product will vary with the proportions of reactants employed, with the particular borylating agent and whether an extraneous alcohol or mercaptan is used. For example, when reacting 3 mole proportions of N,N-dicyclohexyl-ethanolamine with 1 mole proportion of boric acid, it is believed that the triester is formed in which all valences of the boron are satisfied by the N,N-dicyclohexyl-aminoethoxy radical formed by the liberation of water. When equal mole proportions of N,N-dicyclohexyl-ethanolamine and boric acid are reacted at a higher temperature, the meta-borate is formed, the meta-borate forming its trimer (boroxine). When the reaction is effected using an extraneous alcohol or mercaptan in addition to the alkanolamine, the resulting borate will be a mixed borate in which one or two of the valences of the boron are satisfied by the alkanolamine and the remaining valence or valences of the boron are satisfied by the alcohol or mercaptan. When employing a trialkyl borate as the borylating agent, either complete or partial transesterification occurs depending upon the proportions of reactants and conditions of operation.

From the above discussion, it will be seen that the exact structure of the borate may vary and also that the product may consist of a mixture of compounds. Accordingly, the additives of the present invention are being claimed generically and by their method of manufacture. It is understood that the different borated compounds meeting the requirements as hereinbefore set forth may be used for the purposes of the present invention but that the different additives are not necessarily equivalent in their effectiveness in the same or different substrates.

As hereinbefore set forth, the additives of the present invention are used for improving the weathering properties of plastics and resins. Although the mechanism in which these compounds function is not completely understood, these compounds serve to protect substrates which undergo ultraviolet light induced oxidation. In addition, these compounds possess anti-static properties and adhesion improving properties. In addition, the compounds are effective as antioxidants and peroxide decomposers and bactericides, especially for petroleum products. Also, they may serve as dye sites in plastics. Furthermore, they are of ready solubility in most substrates. These substrates normally subject to exposure to weather include plastics. In addition, the additives of the present invention may be used in paints, varnishes and other coatings.

Illustrative plastics which are stabilized by the novel compounds of the present invention comprise polyesters, including linear or cross-linked, reinforced polyesters, laminate polyesters, etc. These polyesters are prepared by the reaction of dihydric alcohols and dicarboxylic acids. Polyester resins generally are condensation polymers resulting from the reaction of dicarboxylic acids with glycols, these being linear polymers. They may be saturated or unsaturated. The saturated polyesters including polyethylene glycol terephthalate, are used principally in the field of fibers and film production. Unsaturated polyesters are used principally in combination with fibrous reinforcement particularly fibrous glass, for fabricating various articles. A number of these polyesters are available commercially and details of these and other polyesters are reported in the literature. Accordingly, a present application is not being burdened with such details, it being understood that the additive of the present invention is used in any polyester subject to deterioration by weathering.

Other plastics which are treated in accordance with the present invention include polycarbonates. These are polyesters of carbonic acid and are formed by transesterification, phosgenation of dihydroxy compounds in the presence of pyridine or by interfacial polycondensation. Still other plastics and resins include phenol-formaldehyde resins, urea-formaldehyde resins, melamine-formaldehyde resins, etc.

Other plastics which are stablized by the additive of the present invention are acryloid plastics, which also are referred to as acrylic resins. These are derived from methyl, ethyl and higher alkyl acrylates and methacrylates used in the polymerization. The acrylates are classified as thermoplastics. Still other substrates are nitrocellulose based coatings, especially cellulose acetate, cellulose acetate propionate, cellulose acetate butyrate, ethyl cellulose, cellulose nitrate, etc. Cellulose acetate esters are prepared by the reaction of chemical cellulose with acetic acid and acetic anhydride, sulfuric acid generally being used as a catalyst. Ethyl cellulose is an ether and manufactured by the reaction of chemical cellulose with caustic to form alkali cellulose, which then reacts with ethyl chloride to form ehtyl cellulose. Cellulose nitrate is also referred to as nitrocellulose and is prepared by the nitration of chemical cellulose, using sulfuric acid as catalyst and dehydrating agent. Here again details on the preparation of the cellulose plastics are available in the literature and are not repeated herein in the interest of brevity.

Still other plastics and resins which are stabilized by the additive of the present invention include ABS, which is a condensation of acrylonitrile, butadiene and styrene. Still other plastics which may be treated in the present invention include polyurethanes, both the flexible and rigid foams, as well as urethane coatings or elastomers. Still other plastics which may be treated in the present invention include epoxy resins, which are thermosetting materials which are converted by curing agents into tough, infusible solids. The most used epoxy resins are formed by reacting epichlorohydrin with a polyhydroxy compound such as bisphenol A in the presence of a catalyst. Here again the literature describes the details of the manufacture of these plastics and resins and need not be repeated herein.

Other plastics which may be treated in accordance with the present invention are in the textile class and include nylon (polyamide), Perlon L or 6-nylon (polyamide), Dacron (terephthalic acid and ethylene glycol), Orlon (polyacrylonitrile), Acrilan (polyacrylonitrile modified with vinyl acetate), rayon, etc. Here again, deterioration occurs due to ultraviolet light and oxidation.

Still other plastics which may be treated in the present invention include polyacetals, especially polyformaldehydes such as "Delrin" and "Celcon", as well as various latexes, lacquers, alkyds, varnishes, polishes, stains, pigments, dyes, textile finishing formulations, etc.

It is understood that the plastic may be fabricated into any desired finished product including moldings, castings, fibers, films, sheets, rods, tubing or other shapes.

Rubber is composed of polymers of conjugated 1,3-dienes, either as polymers thereof or as copolymers thereof with other polymerizable compounds, and the rubbers, both natural and synthetic, are included as solid polymers in the present specifications and claims. Synthetic rubbers include SBR rubber (copolymer of butadiene and styrene), Buna A (copolymer of butadiene and acrylonitrile), butyl rubber (copolymer of butadiene and isobutylene), Neoprene rubber (chloroprene polymer), Thiokol rubber (polysulfide), silicone rubber, EPR rubber (a terpolymer of ethylene, propylene and a diene), etc. The natural rubbers include hevea rubber, cautchouc, balata, gutta-percha, etc. It is well known that rubber undergoes deterioration due to oxygene and, when exposed to direct sunlight for extended periods of time, also undergoes deterioration from this source.

The above illustrative examples of various plastics and solid polymers are improved by the additives of the present invention. As hereinbefore set forth, still other substrates include paints, varnishes, drying oils, pigments, rust preventive coatings, wax coatings, protective coatings, etc. It is understood that the compounds of the present invention may be used in any coating which is subject to exposure to ultraviolet light, oxidation, heat, etc. While the compounds are especially useful in materials subject to such exposure, it is understood that the compounds of the present invention also may be used advantageously in other coatings, plastics, paints, etc., which normally are not exposed outdoors.

In many applications it is advantageous to utilize the compounds of the present invention in conjunction with other additives. For example, particularly improved results are obtained in the stabilization of plastics, apparently due to a synergistic effect, when the compound of the present invention is used in admixture with a phenolic antioxidant including particularly 2,6-di-tert-butyl-4-methylphenol. Other inhibitors which may be used generally will be of the phenolic or amine type and include phenyl-alpha-naphthylamine, phenyl-beta-naphthylamine, phenothiazine, Nonox WSP, Nonox C1, dialkylated phenols, trialkylated phenols including 2,4-dimethyl-6-tert-butylphenol, etc., Santonox R, Santowhite, alkyl-alkoxyphenols, 2246 (2,2'-methylene-bis-(4-methyl-6-tert-butylphenol) and 425 (2,2'-methylene-bis-(4-ethyl-6-tert-butylphenol) (American Cyanamid), diphenyl-p-phenylenediamine, 1,1,3 - tris - (2 - methyl - 4 - hydroxy - 5 - tert-butylphenyl)-butane, 703 (2,6 - di - tert - butyl - alpha-dimethylamino-p-cresol) (Ethyl Corporation), 4,4'-bis-(2-methyl - 6 - tert - butylphenol), 4,4'-thiobis-(6-tert-butyl-o-cresol), 4,4'-bis-(2,6-di-tert-butylphenol), 4,4'-methylene-bis-(2,6-di-tert-butylphenol), Salol (salicyclic acid esters), p-octyl-phenylsalicylate, various phosgene alkylated phenol reaction products, various alkoxyalkyldihydroxybenzophenones, polyalkyldihydroxybenzophenones, tetrahydroxybenzophenones, 2,4,5 - trihydroxybutyrophenone and especially such hydroxybenzophenones as 2,2' - dihydroxy - 4 - octoxybenzophenone, 2,2'-dihydroxy - 4 - decoxybenzophenone, 2,2'-dihydroxy-4-dodecoxybenzophenone, 2,2'-dihydroxy-4-octadecoxybenzophenone, etc., in general any alkoxy or cycloalkoxy substituted 2,2'-dihydroxybenzophenone, 2-hydroxy-4'-octoxybenzophenone, 2 - hydroxy - 4' - decoxybenzophenone, 2 - hydroxy - 4' - dodecoxy, etc., and in general any alkoxy or cycloalkoxy substituted 2-hydroxybenzophenone. Other ultraviolet light stabilizers include nickel-bis-dithiocarbamates, nickel - bis - dihydroxypolyalkylphenol sulfides, especially [2,2'-thiobis-(4-tert-octylphenolato)]-n-butylamine nickel (II), dilauryl beta-mercaptodipropionate, dihydroxytetraalkyl sulfides, dihydroxytetralkyl methanes, various trithiophosphites as trilaurylthiophosphite, dialkylphosphites, trialkylphosphites, high molecular weight nitriles, various Mannich bases, various N-hydroxyphenylbenzotriazoles such as 2-(2'-hydroxy-5'-octylphenyl) - benzotriazole, 2 - (2-hydroxy-5'-dodecylphenyl)-benzotriazole, 2 - (2' - hydroxy - 5' - octoxyphenyl)-benzotriazole, 2 - (2' - hydroxy - 5' - dodecoxyphenyl)-benzotriazole, Tinuvin 326, etc., in general, any alkyl or alkoxyphenyl substituted benzotriazole, etc. The additional inhibitor may be used in a concentration of from about 1% to about 75% by weight of the compound of the present invention. Generally, the additional inhibitor will be used in a concentration within the range of from about 0.001% to about 3% and more particularly from about 0.01% to about 2% by weight of the substrate.

The additive of the present invention will be used in a stabilizing concentration which will depend upon the particular substrate. The additive may be used in a concentration as low as 0.0001% to as high as 25% but generally will be used in a concentration of from about 0.01% to about 5% by weight of the substrate. The additive is incorporated in the substrate in any suitable manner. Incorporation into a solid plastic is readily obtained by adding the additive to the hot melt with stirring, generally in a Banbury mixer, extruder or other device. When added to paint, the additive is incorporated into the paint with intimate stirring.

The additive of the present invention may be utilized as such or prepared as a solution in a suitable solvent including alcohols and particularly methanol, ethanol, propanol, butanol, etc., hydrocarbons and particularly benzene, toluene, xylene, cumene, Decalin, etc.

The following examples are introduced to illustrate further the novelty and utility of the present invention but not with the intention of unduly limiting the same.

Example I

The additive of this example was prepared by the reaction of 3 mole proportions of N,N-dicyclohexyl-ethanolamine with 1 mole proportion of boric acid. Specifically, 68.4 g. (0.3 mole) of N,N-dicyclohexyl-ethanolamine and 6.18 g. (0.1 mole) of boric acid were refluxed in the presence of 100 g. of benzene at a temperature of about 85° C. The heating and refluxing was continued until a total of 5 cc. of water was collected. Following completion of the reaction, the benzene was removed by vacuum distillation at a temperature of about 170° C. at 0.4 mm. Hg. The product was recovered as a liquid having a basic nitrogen content of 4.29 meq./g., an acid value of 0.008 meq./g. and a boron content of 1.42% by weight. This corresponds to the theoretical boron content of 1.58% by weight for the compound tris-(N,N-dicyclohexyl-aminoethoxy) borate having the formula:

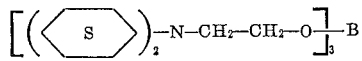

Example II

The additive mixture of this example is believed to include the same compound as prepared in Example I. This preparation was made by refluxing 67.5 g. (0.3 mole) of N,N-dicyclohexyl-ethanolamine and 26 g. (0.1 mole+10%) of tri-n-butyl borate at a temperature ranging from 150° to 203° C. The refluxing was continued until a total of 20 g. of butanol was collected, the butanol being formed by the transesterification reaction. The reaction product was distilled at a temperature of about 159° C. under a vacuum of 18 mm. Hg. The product was recovered as a liquid having a boron content of 1.72% by weight. It will be noted that a 10% excess of tri-n-butyl borate was employed in this run and, on the basis that the excess underwent chelation during the reaction, the theoretical percent boron of the mixed reaction product is calculated to be 1.69% by weight.

Example III

The additive of this example is the meta-borate (boroxine) formed by the reaction of N,N-dicyclohexyl-ethanolamine and boric acid. This reaction was effected by heating and refluxing 33.75 g. (0.15 mole) of N,N-dicyclohexyl-ethanolamine and 9.28 g. (0.15 mole) of boric acid in the presence of 100 g. of benzene. The temperature of reaction was above 90° C. and a total of 4.9 cc. of water was collected. The product was a solid having a boron content of 4.05% by weight which corresponds to the theoretical boron content of 4.15% by weight for the meta-borate formed by the reaction of equal mole proportions of N,N-dicyclohexyl-ethanolamine and boric acid.

Example IV

The additive of this example was prepared by the reaction of N,N-dicyclohexyl-ethanolamine and nonyl boric acid. Specifically, 22.5 g. (0.1 mole) of N,N-dicyclohexylethanolamine and 8.59 g. (0.05 mole) of nonyl boric acid were heated and refluxed in the presence of 50 g. of benzene. A total of 1.4 cc. of water was collected. The product was vacuum distilled at a temperature of 115° C. and 18 mm. Hg. The product is believed to be the N,N-dicyclohexyl-aminoethoxy diester of nonyl boric acid. 1.71% by weight of boron was found on analysis.

Example V

The additive of this example was prepared by the reaction of N,N-di-sec-octyl-ethanolamine and boric acid. It was prepared by heating and refluxing 33.7 g. (0.118 mole) of N,N-di-(1-methylheptyl)-ethanolamine and 2.43 g. (0.039 mole) of boric acid in 100 g. of benzene at a temperature of about 85° C. Following completion of the reaction and removal of the benzene by vacuum distillation at 145° C. and 18 mm. Hg, the product was recovered as a liquid having a boron content of 1.30% by weight. This corresponds to a theoretical boron content of 1.25% by weight for the triester of the reaction of 3 mole proportions of the N,N-di-sec-octyl-ethanolamine with 1 mole of boric acid and may be illustrated by the formula:

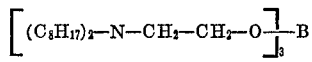

Example VI

The additive of this example is prepared by heating and refluxing 2 mole proportions of N,N-di-isopropyl-propanolamine, 1 mole proportion of isooctyl alcohol and 1 mole proportion of boric acid in the presence of 200 g. of benzene. The reaction is continued until the desired amount of water is collected, after which the liquid product is subjected to distillation under vacuum to remove the benzene solvent.

Example VII

The additive of this example is prepared by heating and refluxing a mixture of 1 mole proportion of boric acid, 2 mole proportions of N,N-dicyclohexyl-propanolamine and 1 mole proportion of 2,6-di-tert-butyl-4-methylphenol in the presence of benzene solvent. The heating and refluxing is continued until the desired amount of water is collected, after which the reaction mixture is subjected to distillation under vacuum to remove the benzene solvent and to recover the liquid product.

Example VIII

The additive of this example is prepared by heating and refluxing a mixture of 1 mole proportion of boric acid, 2 mole proportions of N,N-di-sec-hexyl-ethanolamine and 1 mole proportion of butyl mercaptan in the presence of benzene solvent. The heating and refluxing is continued until the reaction is completed and the product then is subjected to vacuum distillation to remove the benzene solvent. The product is recovered as a liquid and may be used as such or formed as a solution in a suitable solvent.

Example IX

The additive, prepared as described in Example I, is used as a weathering agent in cellulose acetate. As hereinbefore set forth the additive of the present invention also is used in conjunction with another additive. In this example, 0.5% by weight of the borate of N,N-dicyclohexyl-ethanolamine, prepared as described in Example I together with 0.15% by weight of 2,6-di-tert-butyl-4-methylphenol are blended into cellulose acetate on heated compounding rolls and formed into sheets. Placques of about 1⅜″ x 1½″ and about 17 mil. thickness are prepared and the placques are inserted into plastic holders affixed onto a rotating drum and exposed to carbon-arc rays at about 52° C. in a weatherometer. For comparative purposes, control sample of the cellulose acetate without the additive also is exposed in the weatherometer. After 480 hours of exposure in the weatherometer, the control sample was brittle. In contrast, the sample of the cellulose acetate containing the additive remains substantially supple and non-discolored after such exposure in the weatherometer.

Example X

This example demonstrates the use of an additive of the present invention in ethyl cellulose. In this example 1% by weight of the borate of N,N-dicyclohexyl-ethanolamine prepared as described in Example I and 0.15% by weight of 2,6-di-tert-butyl-4-methylphenol are incorporated in the ethyl cellulose. The samples of the ethyl cellulose, without the additives, are prepared as strips which are exposed outdoors, facing south at a 45° angle, at Des Plaines, Ill. These samples remain outdoors during the months of May, June, July and August, during which months the rays of the sun are most severe and the plastic normally undergoes greater deterioration. The control sample (not containing the additives) of the ethyl cellulose undergoes a 65% loss in tensile strength. In contrast, the sample containing the additives shows no substantial change in tensile strength after such exposure outdoors.

Example XI

This example illustrates the use of an additive of the present invention in nitrocellulose coating. The nitrocellulose lacquer also contains dibutylphthalate, Rezyl 99-5 and castor oil dissolved in a mixture of solvents composed of ethanol, n-butanol, methylethyl ketone, butyl acetate, toluene and xylene. The additive of this example is the borate of N,N-dicyclohexyl-ethanolamine, prepared as described in Example I, and is incorporated in the nitrocellulose lacquer in a concentration of 2% by weight based on the nitrocellulose. This lacquer is used to coat unprimed aluminum panels. The panels are exposed outdoors for a period of a year. Little yellowing or crazing is observed in the coating after such exposure.

Example XII

This example illustrates the use of an additive of the present invention in polyester resin. The polyester resin is prepared by the reaction of maleic anhydride, phthalic anhydride and propylene glycol. A 70:30 mixture of the polyester with styrene is cooled and 1% by weight of the borate of N,N-dicyclohexyl-ethanolamine, prepared as described in Example I, and 0.15% by weight of tert-butyl-hydroquinone are added, followed by the addition of 1% by weight of benzoyl peroxide. The resin is cured at 60–90° C. for 16 hours, strips of ⅛″ x ½″ are cut and evaluated in the weatherometer. Periodically light transmittance of the exposed samples is taken. After 408 hours, control sample of the polyester resin, not containing the additive, undergoes considerable yellowing. The sample containing the additives does not undergo such yellowing and little change is noticed in the light transmittance at 620 and 420 mμ of the sample containing the additives.

Example XIII

In this example, 1% by weight of N,N-di-sec-octyl-ethanolamine, prepared as described in Example V, is incorporated in polyethylene glycol terephthalate and extruded through a ring dye into a film. Samples of the plastic containing the additive remain substantially unchanged after exposure for 300 hours in the weatherometer.

Example XIV

This example illustrates the use of the additive of the present invention in ABS. The additive in this example comprises 1% by weight of N,N-dicyclohexyl-ethanolamine, 0.3% by weight of 1,1,3-tris-(2-methyl-4-hydroxy-5-tert-butylphenyl)-butane and 0.6% by weight of dilauryl-thiodipropionate. The additive mixture is milled into ABS (acrylonitrile-butadiene-styrene plastic) for 5 minutes on heated rolls. Dumbbell specimens are prepared and are exposed to the weatherometer.

The yield value of control specimen (not containing the additives) dropped from 5524 p.s.i. to 1576 p.s.i. in 120 hours. In contrast the sample containing the additive mixture is stabilized for a considerably longer period.

Example XV

The borate of N,N-dicyclohexyl-ethanolamine, prepared as described in Example I, is incorporated in a concentration of 4% by weight in an epoxy resin prepared from bis-(epoxy-cyclopentyl)-ether and ethylene glycol. The additive serves both as a catalytic hardener and as a stabilizer to retard deterioration of the resin.

Example XVI

In this example, wood finish is coated with the polyurethane coating prepared from polypropylene glycol having a molecular weight of 1000, trimethylol-propane and 2,3-propanediol and 30% by weight of solvents composed of xylene, ethylene glycol monoethyl ether acetate containing toluenediisocyanate. In this coating, 1% by weight of the borate of N,N-di-sec-octyl-propanolamine is added and serves both as a curing catalyst and as a weathering stabilizer.

I claim as my invention:

1. Plastic or resin normally subject to deterioration be weathering and selected from the group consisting of polyester, polycarbonate, polyurethane, epoxy resin, acrylonitrile-butadiene-styrene plastic and cellulose plastic containing as a stabilizer against such said weathering, a small but stabilizing concentration of a borate of an alkanolamine selected from the group consisting of N,N-di-sec-alkyl-alkanolamine in which the sec-alkyl groups each contain from 3 to about 20 carbon atoms and the alkanolamine moiety contains from 2 to 8 carbon atoms and N,N-dicycloalkyl-alkanolamine in which the alkanolamine moiety contains from 2 to about 8 carbon atoms.

2. The composition of claim 1 wherein said borate is a borate of N,N-dicyclohexyl-ethanolamine.

3. The composition of claim 1 wherein said borate is a borate of N,N-di-sec-octyl-ethanolamine.

4. The composition of claim 1 also containing a phenolic antioxidant.

5. The composition of claim 4 wherein said phenolic antioxidant is 2,6-di-tert-butyl-4-methylphenol.

References Cited

UNITED STATES PATENTS

| | | | |
|---|---|---|---|
| 3,227,739 | 1/1966 | Versteed | 260—584 |
| 3,011,992 | 12/1961 | Anderson | 260—45.9 |
| 2,872,479 | 2/1959 | Letsinger | 260—584 |
| 2,769,840 | 11/1956 | Sowa | 260—584 |
| 2,991,299 | 7/1961 | Omietanski | 260—584 |

DONALD E. CZAJA, *Primary Examiner.*

H. E. TAYLOR, *Assistant Examiner.*

U.S. Cl. X.R.

260—45.9, 29.7, 45.8, 45.95, 45.75, 45.85, 462, 584